(12) United States Patent
Jin et al.

(10) Patent No.: US 9,690,109 B2
(45) Date of Patent: Jun. 27, 2017

(54) STEREOPSIS IMAGE DISPLAY DEVICE

(71) Applicant: LG Display Co., LTD., Seoul (KR)

(72) Inventors: You-Yong Jin, Seoul (KR); Byung Joo Lee, Seoul (KR); Hoon Ki Kim, Incheon (KR); Ju Hoon Jang, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 222 days.

(21) Appl. No.: 14/488,755

(22) Filed: Sep. 17, 2014

(65) Prior Publication Data

US 2015/0185489 A1     Jul. 2, 2015

(30) Foreign Application Priority Data

Dec. 30, 2013 (KR) .......................... 10-2013-0167795

(51) Int. Cl.
*G02B 27/22* (2006.01)
*H04N 13/04* (2006.01)

(52) U.S. Cl.
CPC ..... *G02B 27/2214* (2013.01); *H04N 13/0404* (2013.01)

(58) Field of Classification Search
CPC .......................... G02B 27/2214; H04N 13/0404
See application file for complete search history.

(56) References Cited

U.S. PATENT DOCUMENTS

| | | | |
|---|---|---|---|
| 5,969,850 A * | 10/1999 | Harrold | G02B 27/2214 348/E13.004 |
| 2005/0259323 A1 | 11/2005 | Fukushima et al. | |
| 2010/0259697 A1 | 10/2010 | Sakamoto et al. | |
| 2011/0128269 A1 | 6/2011 | Lee et al. | |
| 2011/0227886 A1 | 9/2011 | Lee et al. | |
| 2012/0032949 A1* | 2/2012 | Lim | H04N 13/0434 345/419 |
| 2012/0086708 A1* | 4/2012 | Lin | G09G 3/003 345/419 |
| 2013/0050283 A1 | 2/2013 | Sato | |
| 2013/0128173 A1* | 5/2013 | Wu | G09G 5/00 349/43 |
| 2013/0135293 A1* | 5/2013 | Kim | G09G 3/003 345/419 |
| 2013/0163078 A1 | 6/2013 | Saito | |
| 2013/0278652 A1 | 10/2013 | Nakahata | |
| 2014/0347409 A1 | 11/2014 | Lv | |

* cited by examiner

*Primary Examiner* — Md Haque
(74) *Attorney, Agent, or Firm* — Dentons US LLP

(57) ABSTRACT

Disclosed is a display device having a display panel wherein the display device includes a plurality of gate lines and a plurality of data lines crossing each other to define a plurality of pixels in the display panel, each pixel being divided into N number of sub-pixel areas including a 2D sub-pixel and a 3D sub-pixel, wherein N is an integer and greater than 1; and a lenticular film including a plurality of lenses and attached to the display panel, wherein 3D sub-pixels on an odd-numbered horizontal line and 3D sub-pixels on an even-numbered horizontal line are alternately arranged on a line-by-line basis in a vertical direction.

18 Claims, 10 Drawing Sheets

STEREOPSIS IMAGE DISPLAY DEVICE

This application claims the benefit of the Korean Patent Application No. 10-2013-0167795, filed on Dec. 30, 2013, which is hereby incorporated by reference for all purposes as if fully set forth herein.

BACKGROUND OF THE INVENTION

Field of the Invention

The present invention relates to a glasses-free three-dimensional (3D) display device that displays 3D images as a multi-view by using a lenticular film, and more particularly, to a stereopsis image display device that divides one pixel into a plurality of sub-pixels, and separately drives the plurality of sub-pixels, thereby increasing a display quality of 2D and/or 3D images.

Discussion of the Related Art

As realistic images are becoming more in demand, stereopsis image display devices that display 3D images as well as 2D images are being developed.

2D-image display devices have been greatly advanced in terms of a quality of a display image such as resolution and viewing angle, but have a limitation in that 2D-image display devices cannot display depth information of an image because they are displaying 2D images.

On the other hand, 3D-image display devices display 3D stereopsis images instead of 2D-planar images, and thus fully transfer original 3D information to a user. Therefore, in comparison with the existing 2D-image display devices, 3D-image display devices display far more vivid and realistic stereopsis images.

3D-image display devices are largely categorized into 3D-glasses display devices using 3D special glasses and glasses-free 3D-display devices using no 3D special glasses. The glasses-free 3D display devices are the same as 3D-special-glasses display devices in the sense that the glasses-free 3D display devices provide a three-dimensionality of an image to a viewer by using a binocular disparity. However, since the glasses-free 3D display devices do not require wearing 3D glasses, the glasses-free 3D-display devices are differentiated from the 3D-special-glasses display devices.

FIGS. 1 and 2 are diagrams illustrating a method of realizing a multi-view in a glasses-free 3D display device according to the related art.

Referring to FIGS. 1 and 2, in the related art glasses-free 3D display device, a display panel 10 in which R, G, and B pixels are arranged in a matrix type displays an image, and a lenticular film 20 is disposed on the display panel 10, thereby enabling a viewer 30 to view a 3D image as a multi-view.

An image is divided and displayed by using N number of pixels in one pitch of a lenticular lens, thereby enabling the viewer 30 to view a 3D image at N number of viewpoints. When the viewer 30 is located at a predetermined view position, different images are projected onto left and right eyes of the viewer 30, and thus, the viewer 30 feels three-dimensionality due to a binocular disparity.

In such lenticular 3D display devices, a resolution of a 3D image is reduced in proportion to the number of multi-views, and even when viewing a 2D image, a resolution is reduced by a factor of 1/N. For this reason, a quality of an image is degraded when viewing 2D images.

FIG. 3 is a diagram for describing a 3D crosstalk problem that occurs when a lenticular lens is inclined at a certain angle and is adhered to a display panel.

Referring to FIG. 3, in a method of realizing a 2D/3D image by using a lenticular film 20 fixed to a display panel, the lenticular film 20 is adhered to the display panel in a state of being inclined at a certain angle.

As described above, when the lenticular film 20 is adhered to the display panel in a state of being inclined at a certain angle, the viewer 30 perceives the proper view as well as other additional views, and for this reason, the 3D crosstalk occurs, causing a degradation in a quality of 3D images.

Since a pitch width of the lenticular lens is widened as the size of the display panel increases, a gap glass or a gap film should be applied for maintaining an appropriate viewing distance.

Moreover, the lenticular film 20 is not freely bent, and it is thus difficult to realize a sufficient depth sensation of 3D images. For this reason, it is difficult to realize realistic 3D images in comparison with the 3D-special-glasses display devices.

SUMMARY OF THE INVENTION

Accordingly, the present invention is directed to provide a stereopsis image display device and method for manufacturing the same that substantially obviates one or more problems due to limitations and disadvantages of the related art.

An advantage of the present invention is directed to provide a stereopsis image display device that can reduce or prevent 3D crosstalk from occurring.

Another advantage of the present invention is directed to provide a stereopsis image display device in which a lenticular film is freely bent.

Another advantage of the present invention is directed to provide a stereopsis image display device that is free of a gap glass or gap film that is typicall applied for maintaining an appropriate viewing distance of a 3D image, and thus, the manufacturing cost and a thickness of the display device can be reduced.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a display device having a display panel may, for example, include a plurality of gate lines and a plurality of data lines crossing each other to define a plurality of pixels in the display panel, each pixel being divided into N number of sub-pixel areas including a 2D sub-pixel and a 3D sub-pixel, wherein N is an integer and greater than 1; and a lenticular film including a plurality of lenses and attached to the display panel, wherein 3D sub-pixels on an odd-numbered horizontal line and 3D sub-pixels on an even-numbered horizontal line are alternately arranged on a line-by-line basis in a vertical direction.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to an embodiment of the present invention, example of which is illustrated in the accompanying drawings. The same reference numbers may be used throughout the drawings to refer to the same or like parts.

Hereinafter, a stereopsis image display device according to an embodiment of the present invention will be described in detail with reference to the accompanying drawings.

Display panels have been variously developed in a twisted nematic (TN) mode, a vertical alignment (VA) mode, an in-plane switching (IPS) mode, and a fringe field switching (FFS) mode according to a scheme of adjusting the alignment of liquid crystal.

A method of driving a stereopsis image display device according to an embodiment of the present invention may be applied to the TN mode, the VA mode, the IPS mode, and the FFS mode without being limited to a specific display mode, and may be applied to other types of flat display panels in addition to liquid crystal panels.

A stereopsis image display device according to an embodiment of the present invention is to decrease a crosstalk of a 3D image and increase a quality of a 2D image.

Figure 1:
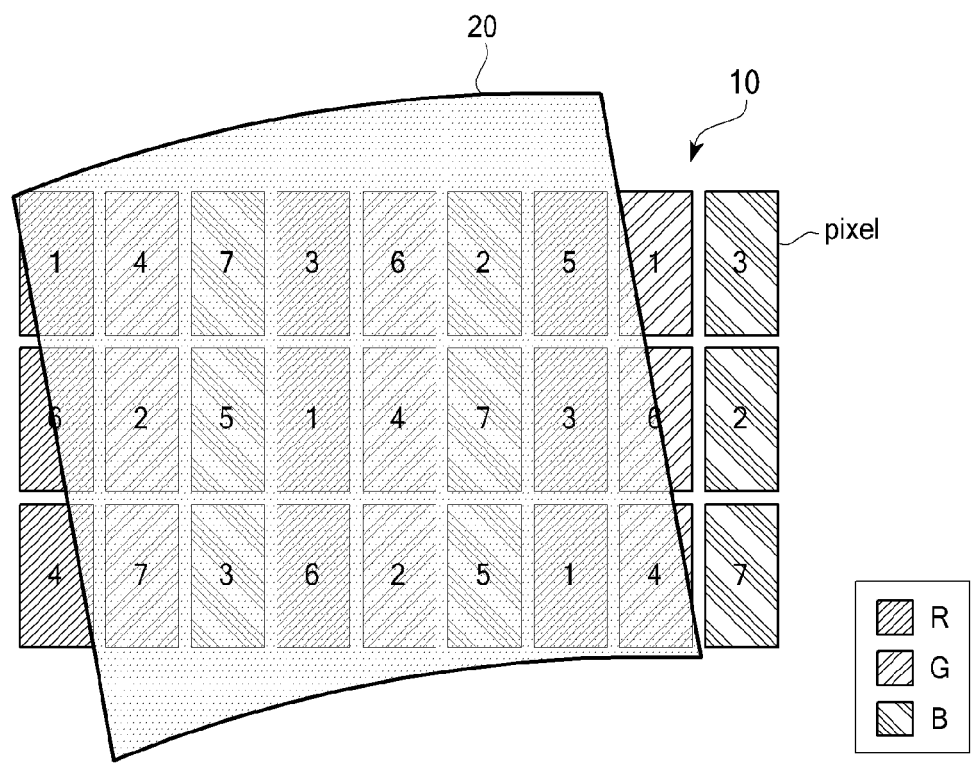
FIGS. 1 and 2 are diagrams illustrating a method of realizing a multi-view in a glasses-free 3D display device according to the related art.
Figure 2:
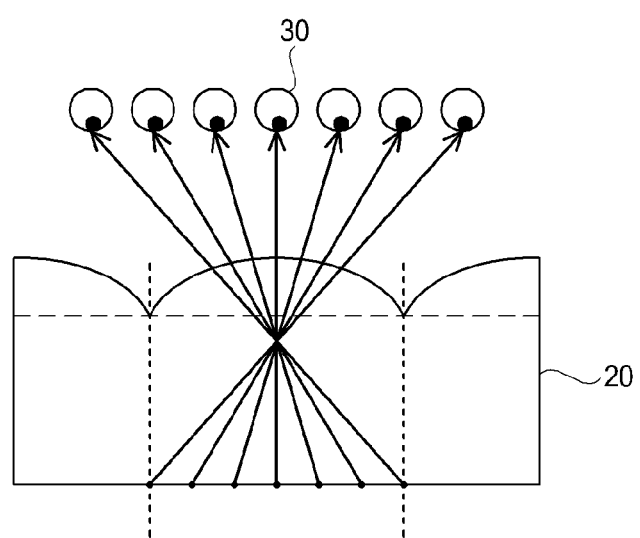
Figure 3:
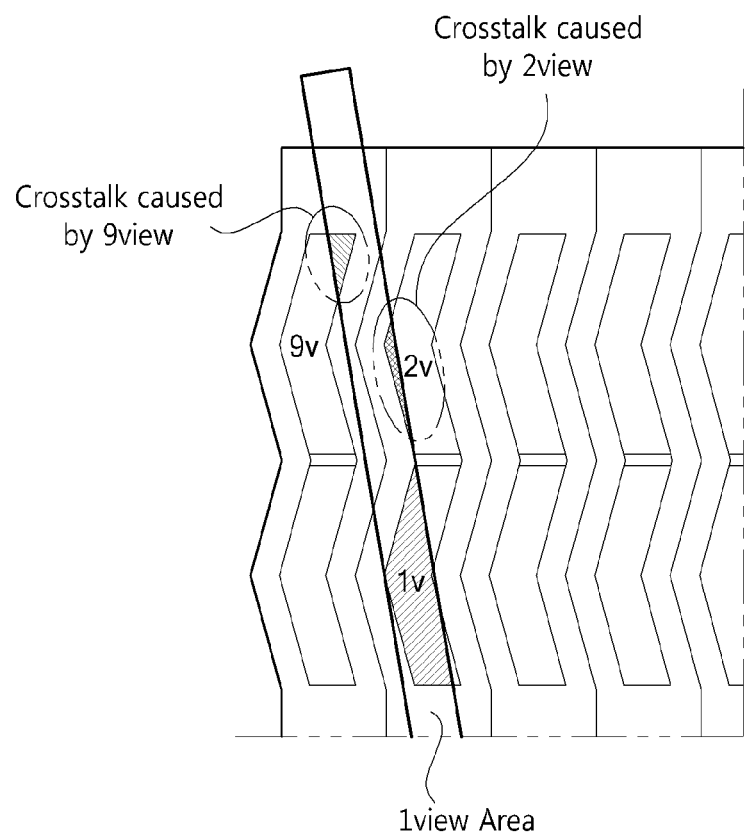
FIG. 3 is a diagram for describing a 3D crosstalk problem that occurs when a lenticular lens is inclined at a certain angle and is adhered to a display panel.
Figure 4:
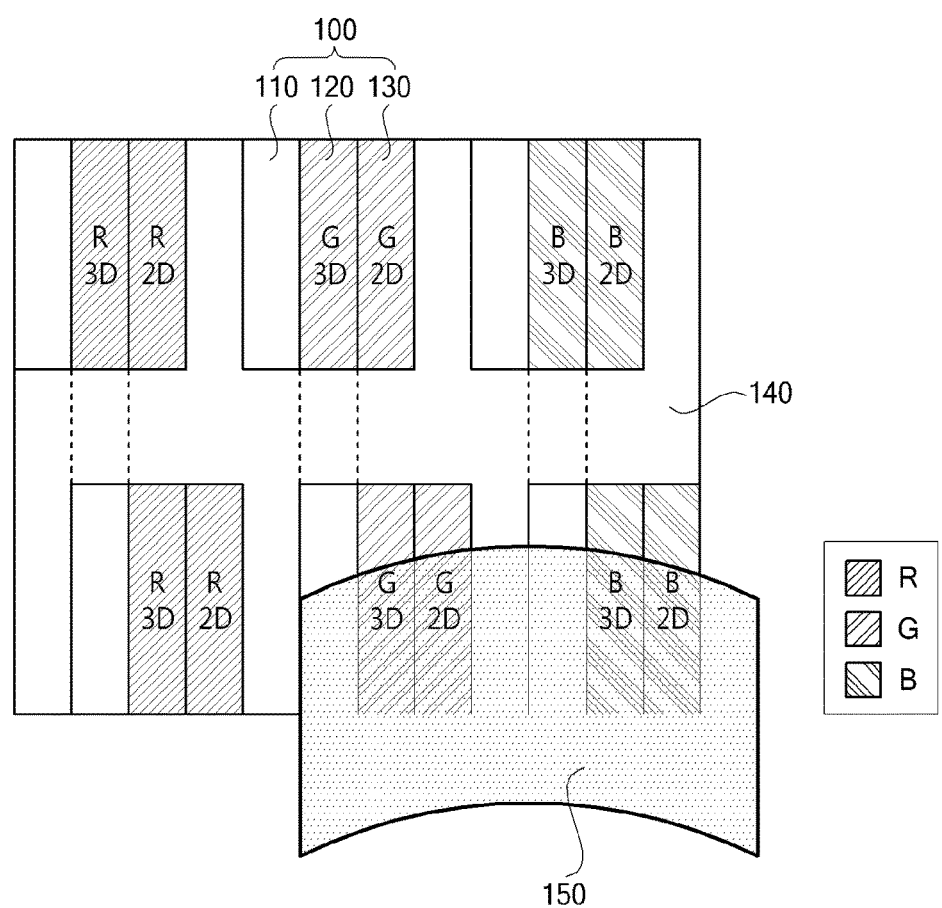
FIGS. 4 and 5 schematically illustrate a stereopsis image display device according to an embodiment of the present invention, and illustrate a pixel structure for realizing a 3D image without degrading a quality of a 2D image.
Figure 5:
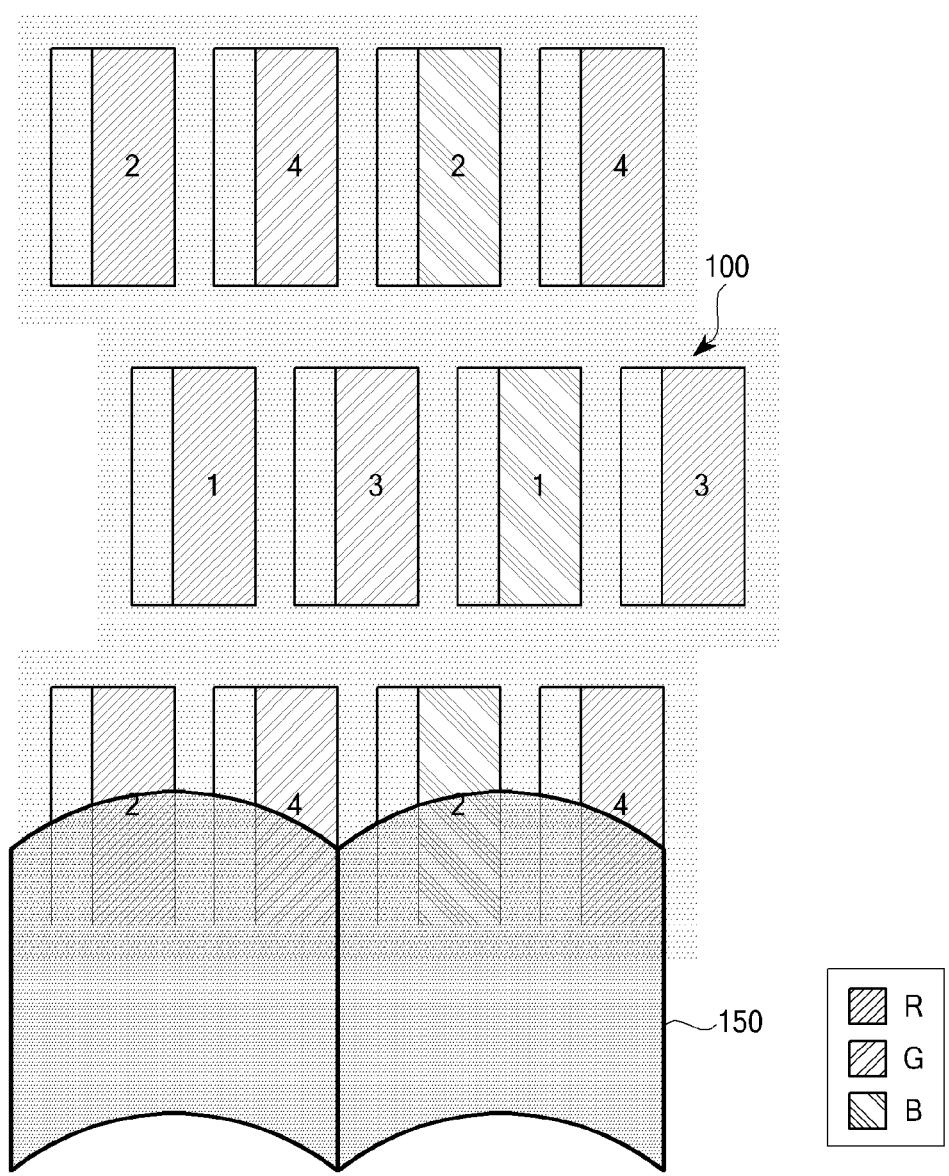

FIGS. 4 and 5 schematically illustrate a stereopsis image display device according to an embodiment of the present invention, and illustrate a pixel structure for realizing a 3D image without degrading a quality of a 2D image.

Referring to FIGS. 4 and 5, a pixel structure is illustrated in which a plurality of pixels are arranged in order for a user to view a 2D/3D image as a multi-view. When realizing a 2D/3D image by using a glasses-free display device to which a lenticular film is applied, a high-quality image may be displayed without a 3D crosstalk. Also, a quality of an image can be prevented from being degraded when viewing a 2D image.

In FIGS. 4 and 5, although a backlight unit and a driving circuit unit are not illustrated, the driving circuit unit for driving a display panel may include a timing controller (T-con), a data driver (D-IC), a gate driver (G-IC), a backlight driver and a power supply.

A plurality of pixels 100 are arranged in a matrix type in the display panel, and a lenticular film with a plurality of lenses 150 formed therein is adhered onto the display panel.

The display panel includes a lower substrate (a thin film transistor (TFT) array substrate), an upper substrate (a color filter array substrate), and a liquid crystal layer disposed therebetween.

The lower substrate (the TFT array substrate) includes a plurality of pixels defined by the crossings between a plurality of data lines and a plurality of gate lines, and each of the plurality of pixels includes a TFT that is a switching element, a storage capacitor (Cst), and a pixel electrode. The upper substrate (the color filter array substrate) includes a red (R) color filter, a green (G) color filter, a blue (B) color filter, and a common electrode corresponding to the pixel electrodes formed on the lower substrate (the TFT array substrate).

An alignment direction of the liquid crystal layer is adjusted by an electric field generated between the pixel electrodes and the common electrode, and thus, a transmittance of light incident from the backlight unit is adjusted, thereby displaying an image.

The display panel including the above-described elements drives the plurality of pixels with input image data to display an image. The plurality of pixels include a plurality of red pixels, green pixels, and blue pixels. One unit pixel is configured with three color pixels, namely, a red pixel, a green pixel, and a blue pixel. Through such a pixel structure, the display panel displays an image.

In the stereopsis image display device according to an embodiment of the present invention, a red pixel, a green pixel, and a blue pixel are arranged in a zigzag type. Here, an opening width of the color filter (CF) array formed on the upper substrate is reduced, thereby adjusting a pitch of the lenticular lens.

In realizing substantially the same view, the pitch of the lenticular lens can be reduced, and a gap glass and a gap film can be removed. Under the same lens pitch as that of the related art, a more number of views can be thus formed by changing a setting of view mapping.

Herein, a gap between dots of a plurality of lenses formed in the lenticular film is set to 0, and a pitch of a lens is set to substantially match a width of two pixels.

Figure 6:
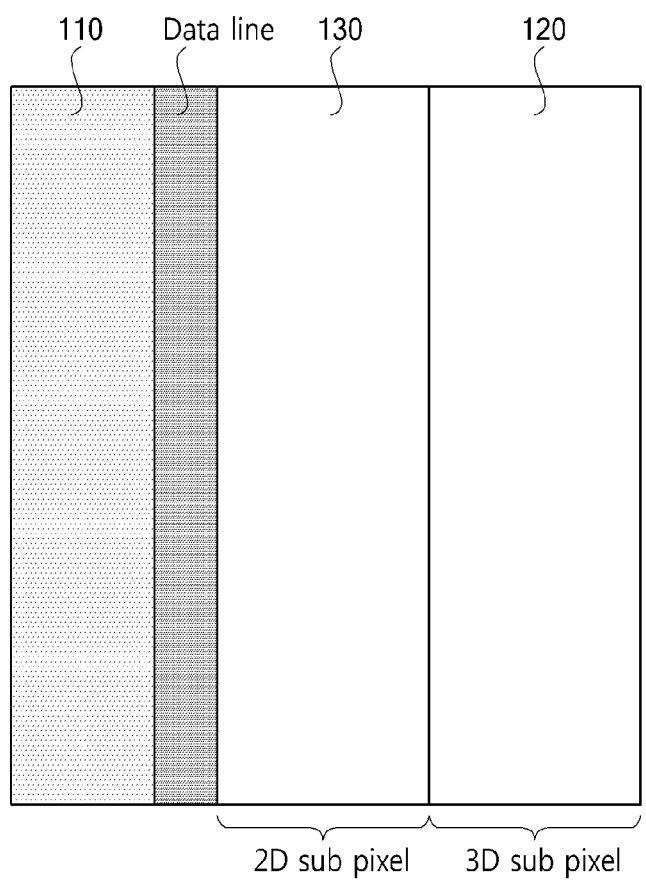
FIG. 6 is a diagram illustrating a pixel structure according to an embodiment of the present invention in which one pixel is divided into three areas.

FIG. 6 is a diagram illustrating a pixel structure according to an embodiment of the present invention in which one pixel is divided into three areas.

Referring to FIG. 6, one pixel 100 is divided into three areas. The one pixel 100 includes a barrier area 110 that blocks light, a 2D sub-pixel 130, and a 3D sub-pixel 120.

The barrier area 110 does not substantially include a driving element, and becomes a barrier that is covered by a black matrix (BM) 140 in the upper substrate, and blocks light.

One pixel area is divided into three areas, namely, the barrier area, the 3D sub-pixel 120, and the 2D sub-pixel 130. Among the divided three areas, one of the sub-pixels is driven to display an image without being limited to a 2D image mode and a 3D image mode. The other sub-pixel is driven to emit light in the 3D image mode, and is turned off in the 2D image mode. In this case, the 2D sub-pixel 130 and the 3D sub-pixel 120 may be formed to have substantially the same area.

In detail, in the 3D image mode, the 3D sub-pixel 120 is turned on, and the 2D sub-pixel 130 is turned off. In the 2D image mode, the 3D sub-pixel 120 and the 2D sub-pixel 130 are all turned on.

In the 3D image mode, the 3D sub-pixel 120 is driven to display an image. However, the present embodiment is not limited thereto. Even in the 2D image mode, the 3D sub-pixel 120 is also driven to display an image.

The 2D sub-pixel 130 is driven in the 2D image mode. In the 3D image mode, the 2D sub-pixel 130 is not driven so that an image displayed by the 3D sub-pixel 120 is divided into a 3D image, and thus becomes a barrier.

That is, in the 3D image mode, only the 3D sub-pixel 120 is driven to display a 3D image. In the 2D image mode, the 2D sub-pixel 130 and the 3D sub-pixel 120 are all driven to display a 2D image.

As described above, one pixel is divided into n number (for example, three) of areas, and in the 3D image mode, one sub-pixel is turned on to decrease a pitch of a lens. Therefore, an appropriate viewing distance can be maintained without a gap glass or a gap film.

Referring back to FIG. 4, according to an embodiment of the present application, 3D sub-pixels on an odd-numbered horizontal line and 3D sub-pixels on an even-numbered horizontal line are alternately arranged on a line-by-line basis in a vertical direction so as to decrease a 3D crosstalk. For example, 3D sub-pixels on an odd-numbered horizontal line and 3D sub-pixels on an even-numbered horizontal line may be arranged so as substantially not to overlap each other on a line-by-line basis in a vertical direction. A right edge of 3D sub-pixels on an odd-numbered horizontal line may substantially coincide with a left edge of 3D sub-pixels on an even-numbered horizontal line on a line-by-line basis in a vertical direction. These arrangements of the 3D sub-pixels can improve the uniformity of luminance throughout the pixels. By doing so, luminance variation depending on the perspectives of a viewer in a horizontal direction can be reduced or minimized.

A red pixel, a green pixel, and a blue pixel may be each shifted by ½, ⅓, or ¼ of a width of one pixel.

A 3D sub-pixel included in a pixel of a view is disposed just under a 3D sub-pixel included in a pixel of one view (1 view), and a barrier area or a 2D sub-pixel included in a pixel is disposed just under the 3D sub-pixel included in the pixel of the one view (1 view).

Herein, the lenticular film is adhered to the display panel in a direction vertical to a pixel without being inclined.

In order to decrease a 3D crosstalk or a line defect, an opening area may be set by dividing a width of a pixel by 1/n. By adjusting a viewing distance based on a width corresponding to a pixel, the gap glass and the gap film may be removed, or a thickness of the display panel may be reduced.

According to an embodiment of the present invention, all the pixels may be arranged in a zigzag type, in which the red pixel, the green pixel and the blue pixel each may be each shifted by a ½ pixel width, a ⅓ pixel width, or a ¼ pixel width, and the lenticular film is vertically adhered to the display panel. Therefore, the gap between the dots of the plurality of lenses formed in the lenticular film may be set to 0, thereby reducing or preventing occurrence of bending.

According to the embodiment of the present invention, in the 2D image mode, a reduction in luminance is thus minimized, while in the 3D image mode, a 3D image is well divided. Accordingly, the quality of both 2D and 3D images can be all enhanced.

Moreover, because the lenticular lens is uprightly disposed in a vertical direction, with the lenticular lens being not inclined, and an overlap of views may thus be fundamentally prevented. Therefore, a high-quality 3D image having a sensation of depth may be realized at the substantially same level as that of the glasses-3D display devices.

Figure 7:
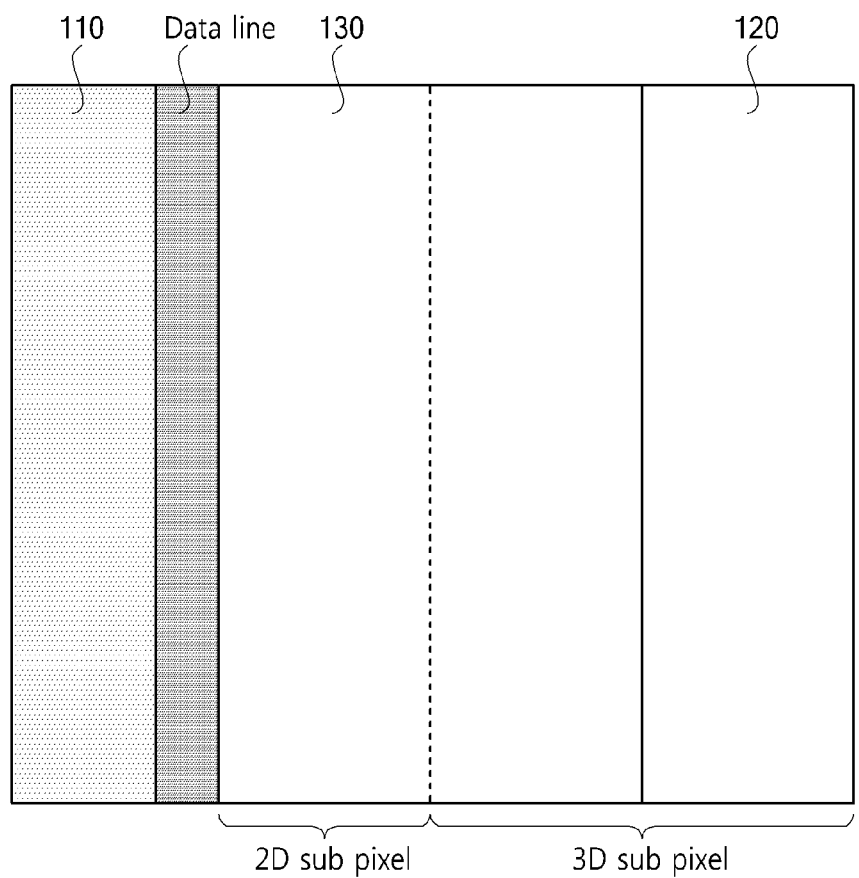
FIG. 7 illustrates a pixel structure according to an embodiment of the present invention in which one pixel is divided into three areas, and illustrates a structure in which an area of a 2D sub-pixel is two times wider than that of a 3D sub-pixel.

FIG. 7 illustrates a pixel structure according to an embodiment of the present invention in which one pixel is divided into three areas, and illustrates a structure in which an area of a 2D sub-pixel is two times wider than that of a 3D sub-pixel.

Referring to FIG. 7, one pixel 100 is divided into three areas. The one pixel 100 includes a barrier area 110 that blocks light, a 2D sub-pixel 130, and a 3D sub-pixel 120.

Herein, an area of the 2D sub-pixel 130 is two times wider than that of the 3D sub-pixel 120.

The barrier area 110 does not substantially include a driving element, and becomes a barrier that is covered by a black matrix (BM) in the upper substrate, and blocks light.

Among the three areas, one of the sub-pixels is driven to display an image without being limited to a 2D image mode and a 3D image mode. The other sub-pixel is driven to emit light in the 3D image mode, and is turned off in the 2D image mode.

In the 3D image mode, the 3D sub-pixel 120 is driven to display an image. However, the present embodiment is not limited thereto. Even in the 2D image mode, the 3D sub-pixel 120 is driven to display an image.

The 2D sub-pixel 130 is driven in the 2D image mode. In the 3D image mode, the 2D sub-pixel 130 is not driven so that an image displayed by the 3D sub-pixel 120 is divided into a 3D image, and thus becomes a barrier.

That is, in the 3D image mode, only the 3D sub-pixel 120 is driven to display a 3D image. In the 2D image mode, the 2D sub-pixel 130 and the 3D sub-pixel 120 are all driven to display a 2D image.

Figure 8:
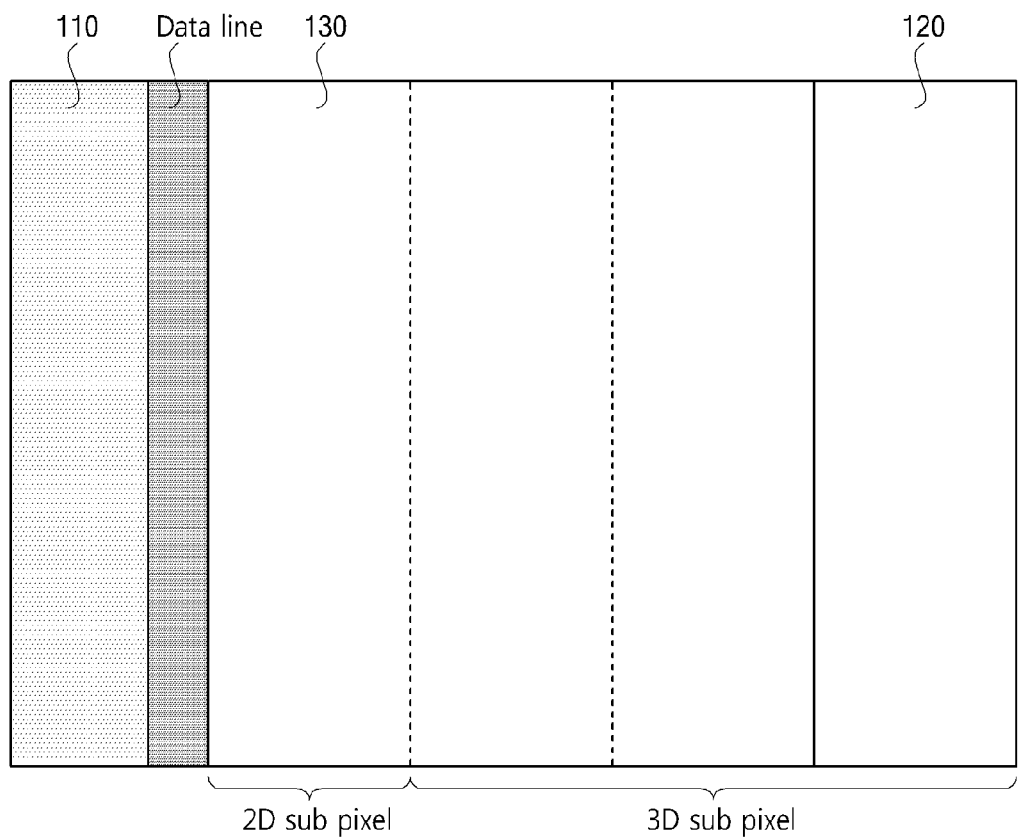
FIG. 8 illustrates a pixel structure according to an embodiment of the present invention in which one pixel is divided into three areas, and illustrates a structure in which an area of a 2D sub-pixel is three times wider than that of a 3D sub-pixel.

FIG. 8 illustrates a pixel structure according to an embodiment of the present invention in which one pixel is divided into three areas, and illustrates a structure in which an area of a 2D sub-pixel is three times wider than that of a 3D sub-pixel.

Referring to FIG. 8, one pixel 100 is divided into three areas. The one pixel 100 includes a barrier area 110 that blocks light, a 2D sub-pixel 130, and a 3D sub-pixel 120.

Here, an area of the 2D sub-pixel 130 is three times wider than that of the 3D sub-pixel 120.

The barrier area 110 does not substantially include a driving element, and becomes a barrier that is covered by a black matrix (BM) in the upper substrate, and blocks light.

Among the three areas, one of the sub-pixels is driven to display an image without being limited to a 2D image mode and a 3D image mode. The other sub-pixel is driven to emit light in the 3D image mode, and is turned off in the 2D image mode.

In the 3D image mode, the 3D sub-pixel 120 is driven to display an image. However, the present embodiment is not limited thereto. Even in the 2D image mode, the 3D sub-pixel 120 is driven to display an image.

The 2D sub-pixel 130 is driven in the 2D image mode. In the 3D image mode, the 2D sub-pixel 130 is not driven so that an image displayed by the 3D sub-pixel 120 is divided into a 3D image, and thus becomes a barrier.

That is, in the 3D image mode, only the 3D sub-pixel 120 is driven to display a 3D image. In the 2D image mode, the 2D sub-pixel 130 and the 3D sub-pixel 120 are all driven to display a 2D image.

Figure 9:
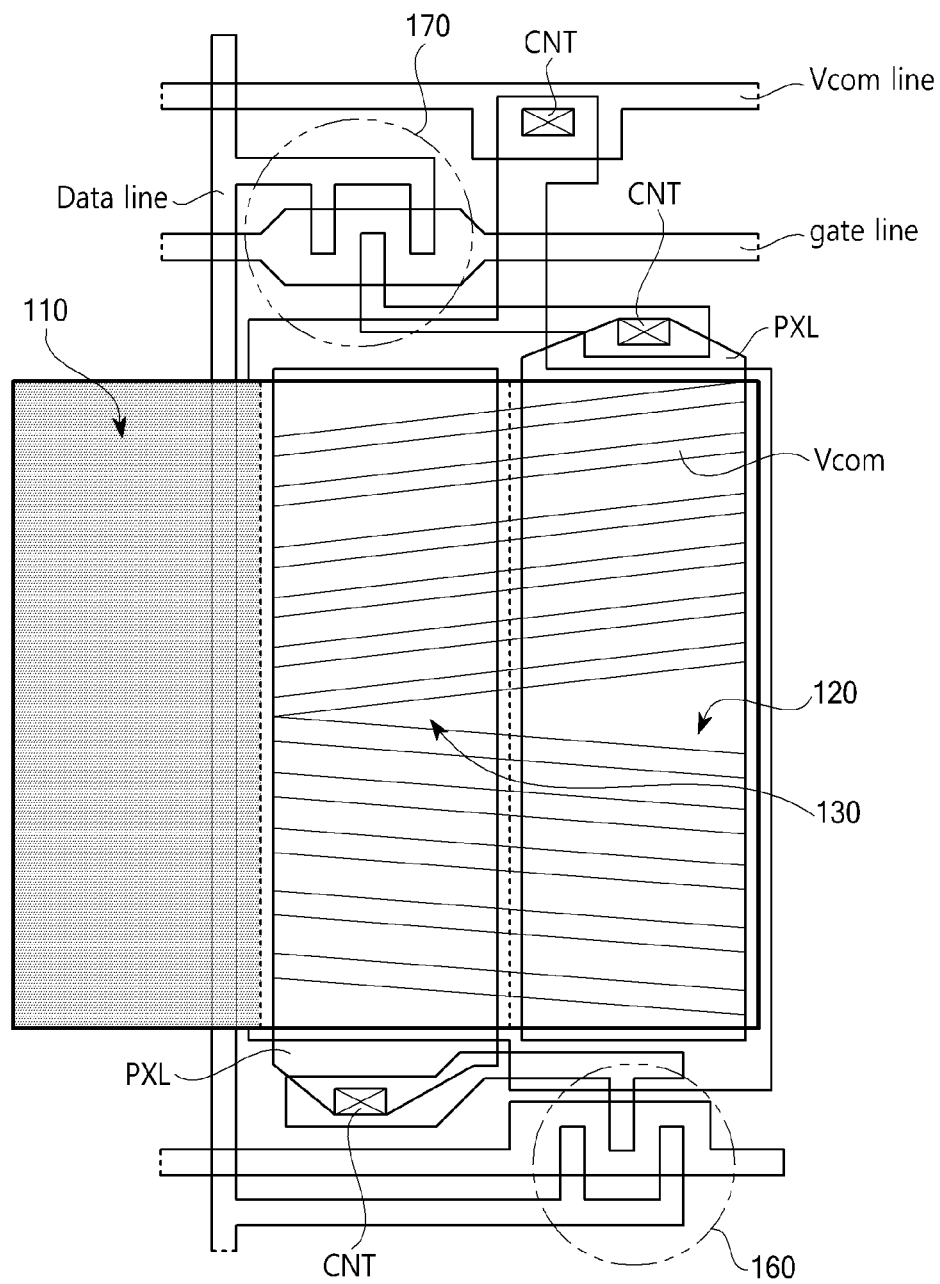
FIG. 9 is a diagram illustrating a layout of a 2D sub-pixel, a layout of a 3D sub-pixel, and a driving method of displaying a 2D image and a 3D image according to an embodiment of the present invention.

FIG. 9 is a diagram illustrating a layout of a 2D sub-pixel, a layout of a 3D sub-pixel, and a driving method of displaying a 2D image and a 3D image according to an embodiment of the present invention.

Referring to FIG. 9, a gate line and a common voltage line (Vcom line) are formed in a width direction. A data line is formed in a vertical direction. A pixel area is defined by intersection between the gate line and the data line.

Here, a 2D gate line and a 3D gate line are formed for separately driving a 2D sub-pixel 130 and a 3D sub-pixel 120. The 2D gate line is formed under a pixel, and the 3D gate line is formed on the pixel.

One pixel 100 is divided into three areas. The one pixel 100 includes a barrier area 110 that blocks light, the 2D sub-pixel 130, and the 3D sub-pixel 120.

The barrier area 110 does not substantially include a driving element, and becomes a barrier that is covered by a black matrix (BM) in the upper substrate, and blocks light. The data line is formed in the barrier area 110.

The 2D sub-pixel 130 is disposed adjacent to the barrier area 110, and the 3D sub-pixel 120 is disposed at the right side of the 2D sub-pixel 130.

A 2D TFT 160 for driving the 2D sub-pixel 130 is formed, and a 3D TFT 170 for driving the 3D sub-pixel 120 is formed.

The 2D TFT 160 is formed under the pixel, and the 3D TFT 170 is formed on the pixel. However, the present embodiment is not limited thereto. For example, the disposed positions of the 2D TFT 170 and the 3D TFT 160 may be switched.

A common electrode (Vcom electrode) is formed in the 2D sub-pixel 130 and the 3D sub-pixel 120 in common A pixel electrode is formed in each of the 2D sub-pixel 130 and the 3D sub-pixel 120. A 2D pixel electrode (2D PXL) contacts a drain of the 2D TFT 160 which is formed under the pixel, and is formed in the 2D sub-pixel 130. A 3D pixel electrode (3D PXL) contacts a drain of the 3D TFT 170 which is formed on the pixel, and is formed in the 3D sub-pixel 120.

As described above, the 3D TFT 170 and the 3D pixel electrode may be separately formed, and the 3D sub-pixel 120 may be independently driven. Also, the 2D TFT 160 and the 2D pixel electrode may be separately formed, and the 2D sub-pixel 130 may be independently driven.

Figure 10:
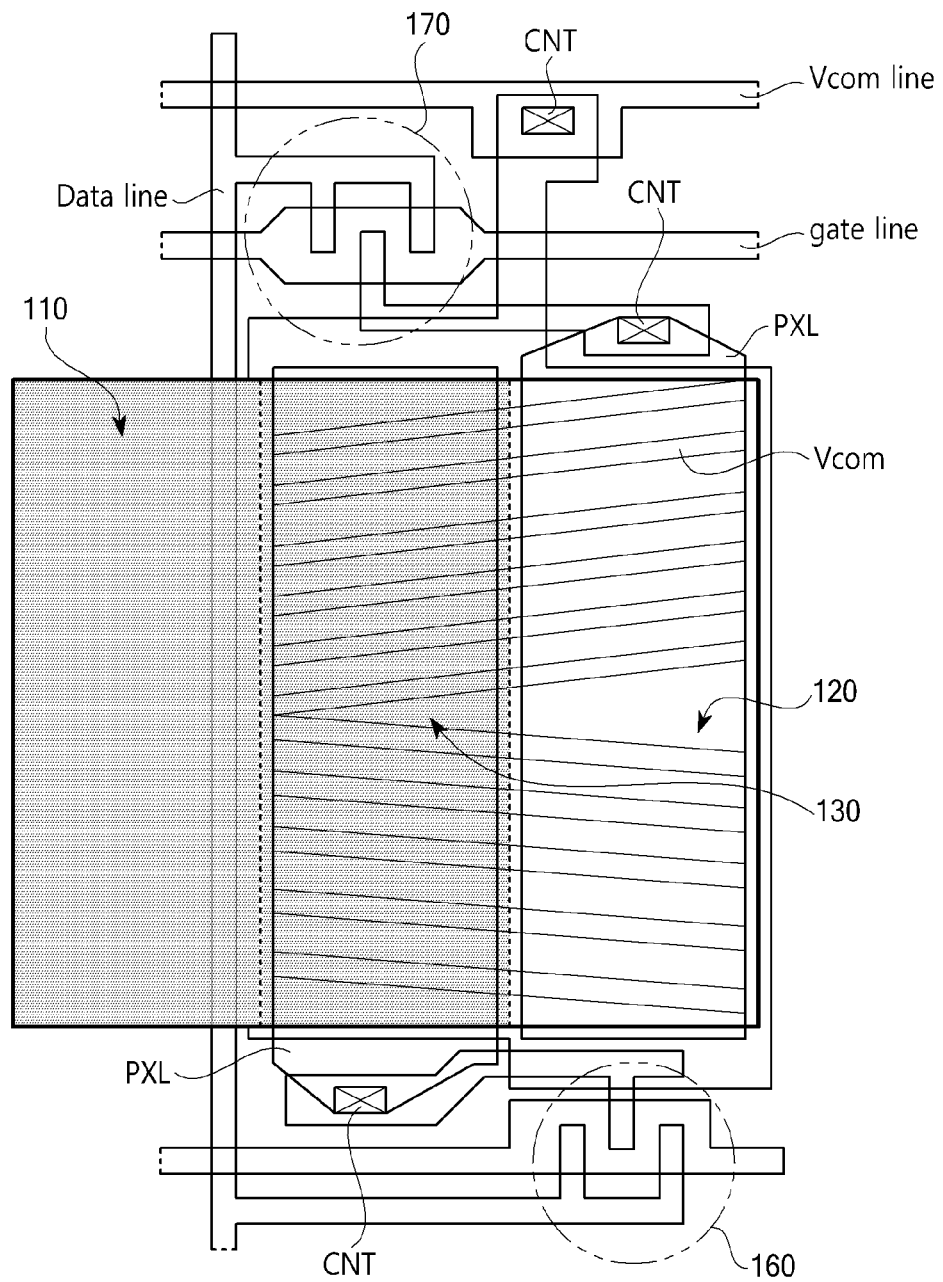
FIG. 10 is a diagram illustrating a stereopsis image display device according to an embodiment of the present invention that is driven in a 3D image mode.

FIG. 10 is a diagram illustrating a stereopsis image display device according to an embodiment of the present invention that is driven in the 3D image mode.

Referring to FIG. 10, in the 3D image mode, a scan signal is applied only to the 3D gate line to turn on the 3D TFT 170. When the 3D TFT 170 is turned on, the data voltage applied to the data line is then charged into the 3D sub-pixel 120, which displays a 3D image.

Figure 11:
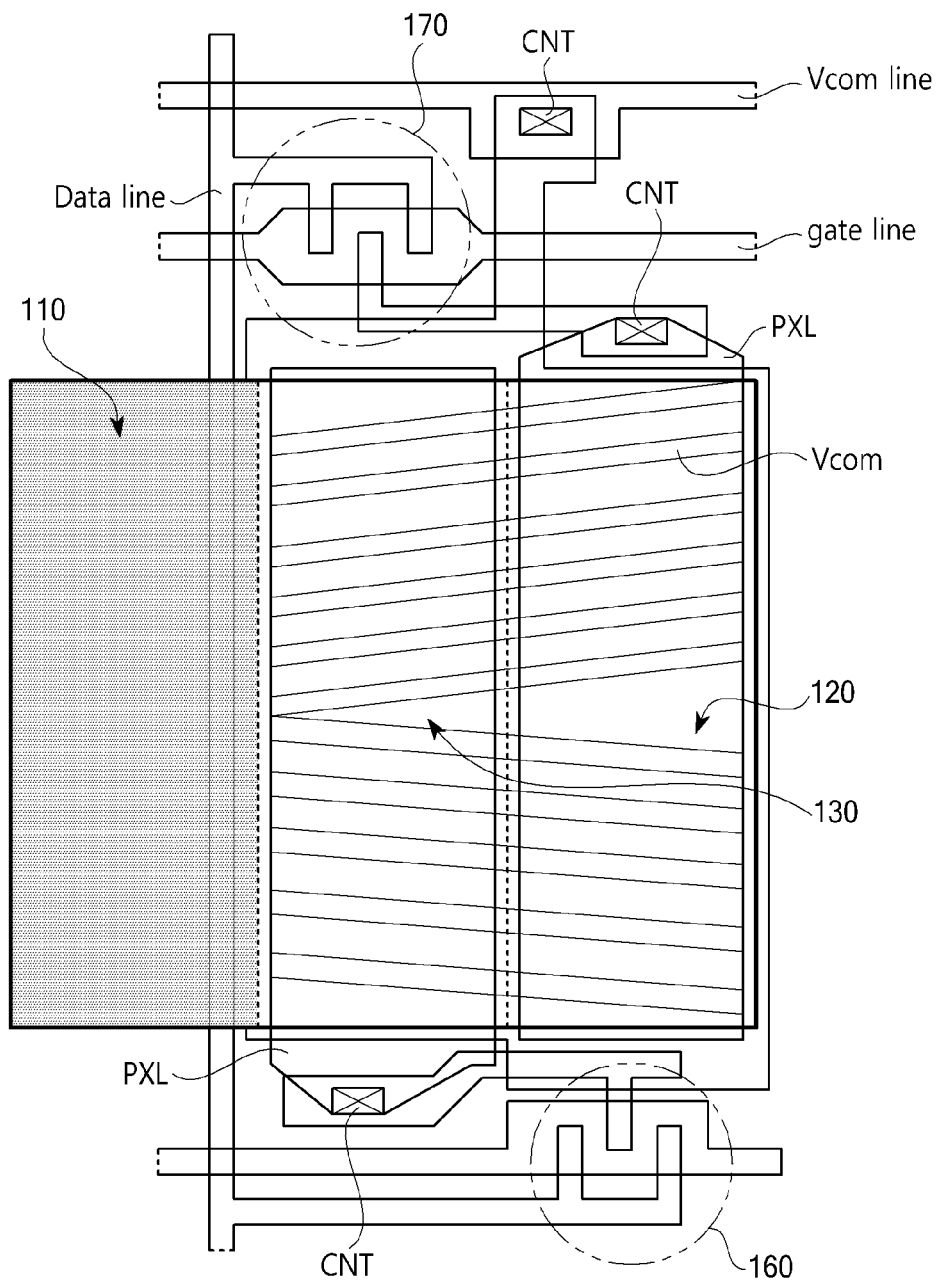
FIG. 11 is a diagram illustrating a stereopsis image display device according to an embodiment of the present invention that is driven in a 2D image mode.

FIG. 11 is a diagram illustrating a stereopsis image display device according to an embodiment of the present invention that is driven in the 2D image mode.

Referring to FIG. 11, in the 2D image mode, when the data voltage is applied to the data line, the scan signal is applied to the 2D gate line and the 3D gate line to turn on the 2D TFT 160 and the 3D TFT 170. When the 2D TFT 160 and the 3D TFT 170 are turned on, the data voltage applied to the data line is charged into the 2D sub-pixel 130 and the 3D sub-pixel 120. As described above, the 2D sub-pixel 130 and the 3D sub-pixel 120 are all driven, and thus display a 2D image.

A stereopsis image display device according to an embodiment of the present invention divides one pixel into a plurality of sub-pixels, and separately drives the plurality of sub-pixels, thereby improving a display quality of a 2D/3D image.

In a stereopsis image display device according to an embodiment of the present invention, a lenticular film is freely bent, thereby reducing or preventing a 3D crosstalk from occurring.

In a stereopsis image display device according to an embodiment of the present invention, a gap glass or a gap film typically applied for maintaining an appropriate viewing distance of a 3D image may be not required, and thus, the manufacturing cost and a thickness of the display device can be reduced.

In a stereopsis image display device according to an embodiment of the present invention, a lenticular film is disposed in a vertical direction, and a high-quality 3D image having a sufficient sensation of depth can be displayed.

Hereinabove, the display panel has been described as a liquid crystal panel that adjusts a light transmittance by using liquid crystal, but the present invention is not limited thereto. In another embodiment of the present invention, an organic light emitting diode (OLED) display panel may be applied as the display panel.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A display device having a display panel, the display device comprising:
    a plurality of gate lines and a plurality of data lines crossing each other to define a plurality of pixels in the display panel, each pixel being divided into N number of sub-pixel areas including a 2D sub-pixel and a 3D sub-pixel, wherein N is an integer and greater than 1; and
    a lenticular film including a plurality of lenses and attached to the display panel, wherein 3D sub-pixels of a first color on an odd-numbered horizontal line and 3D sub-pixels of the first color on an even-numbered horizontal line are alternately arranged on a line-by-line basis in a vertical direction, and
    wherein the 3D sub-pixels of the first color on the even-numbered horizontal line are shifted by a lateral pitch of sub-pixels with respect to the 3D sub-pixels of the first color on the odd-numbered horizontal line, and
    wherein the 2D sub-pixel and the 3D sub-pixel emit light, when the display device displays a 2D image, and
    wherein the 2D sub-pixel does not emit light and the 3D sub-pixel emits light, when the display device displays a 3D image.

2. The display device according to claim 1, wherein the 3D sub-pixels of the first color on the odd-numbered horizontal line and the 3D sub-pixels of the first color on the even-numbered horizontal line do not overlap with each other.

3. The display device according to claim 1, wherein a right edge of the 3D sub-pixels of the first color on the odd-numbered horizontal line substantially coincides with a left edge of the 3D sub-pixels of the first color on the even-numbered horizontal line.

4. The display device according to claim 1, wherein each pixel further includes a barrier area.

5. The display device according to claim 4, wherein the barrier area is substantially covered by a black matrix on an upper substrate of the display panel.

6. The display device according to claim 2, wherein a pitch of the lenses substantially matches a width of two pixels of the plurality of pixels.

7. The display device according to claim 1, wherein the lenticular film is attached to the display panel in a vertical direction with substantially no inclination to a direction of the plurality of pixels.

8. The display device according to claim 7, wherein a gap between dots of the plurality of lenses in the lenticular film is set to substantially 0.

9. The display device according to claim 1, wherein an area of the 3D sub-pixel is substantially two times wider than that of the 2D sub-pixel.

10. The display device according to claim 1, wherein an area of the 3D sub-pixel is substantially three times wider than that of the 2D sub-pixel.

11. The display device according to claim 1, wherein each pixel is connected to a 2D gate line and a 3D gate line of the plurality of gate lines and one of the plurality of data lines.

12. The display device according to claim 11, wherein each pixel further includes a 2D TFT connected to the 2D gate line and the data line and a 3D TFT connected to the 3D gate line and the data line.

13. The display device according to claim 11, wherein the data line is formed in a barrier area of each pixel.

14. The display device according to claim 13, wherein the 2D sub-pixel is located between the barrier area and the 3D sub-pixel.

15. The display device according to claim 11, wherein a scan signal is applied to the 3D gate line, but not to the 2D gate line, when the display device displays a 3D image.

16. The display device according to claim 15, wherein the scan signal is applied to the 3D gate line and the 2D gate line, when the display device displays a 2D image.

17. The display device according to claim 11, wherein the 2D TFT is turned off and the 3D TFT is turned on, when the display device displays a 3D image.

18. The display device according to claim 17, wherein the 2D and 3D TFTs are turned on, when the display device displays a 2D image.

* * * * *